(12) United States Patent
Okamura

(10) Patent No.: US 10,142,497 B2
(45) Date of Patent: Nov. 27, 2018

(54) IMAGE PRINTING SYSTEM, METHOD IN IMAGE PROCESSING APPARATUS, AND STORAGE MEDIUM

(71) Applicant: CANON KABUSHIKI KAISHA, Tokyo (JP)

(72) Inventor: Koji Okamura, Kawasaki-shi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/583,178

(22) Filed: May 1, 2017

(65) Prior Publication Data
US 2017/0339288 A1 Nov. 23, 2017

(30) Foreign Application Priority Data
May 19, 2016 (JP) ................................. 2016-100670

(51) Int. Cl.
| | |
|---|---|
| *H04N 1/00* | (2006.01) |
| *G06F 3/12* | (2006.01) |
| *G06K 15/02* | (2006.01) |
| *H04N 1/44* | (2006.01) |

(52) U.S. Cl.
CPC ....... *H04N 1/00251* (2013.01); *G06F 3/1222* (2013.01); *G06F 3/1238* (2013.01); *G06K 15/02* (2013.01); *H04N 1/4413* (2013.01); *H04N 2201/0039* (2013.01)

(58) Field of Classification Search
USPC ....................................................... 358/1.15
See application file for complete search history.

(56) References Cited

U.S. PATENT DOCUMENTS

| | | | | |
|---|---|---|---|---|
| 7,266,374 B2* | 9/2007 | Kim | ...................... | H04W 24/04 370/328 |
| 2013/0148161 A1* | 6/2013 | Park | ...................... | G06F 3/1296 358/1.15 |
| 2014/0268222 A1* | 9/2014 | Inoue | ...................... | G06F 3/1221 358/1.15 |

(Continued)

FOREIGN PATENT DOCUMENTS

JP 2007-076187 A 3/2007

*Primary Examiner* — Ngon Nguyen
(74) *Attorney, Agent, or Firm* — Carter, DeLuca, Farrell & Schmidt, LLP

(57) ABSTRACT

It is made possible to print an image stored in an image processing apparatus by a printing apparatus without requiring a complicated operation. By a printing apparatus operating as a first access point by fixed authentication information, in the case where the communication is controlled in a first mode for performing a wireless LAN connection with an image processing apparatus storing the fixed authentication information, a beacon signal including a specific SSID included in the fixed authentication information is transmitted, and in the case where the image processing apparatus receives printing instructions, a connection without intervention of a second access point different from the printing apparatus and the image processing apparatus is established with the printing apparatus by using the fixed authentication information and an image to be printed is transmitted to the printing apparatus on a condition that a beacon signal including the specific SSID is detected.

20 Claims, 14 Drawing Sheets

(56) References Cited

U.S. PATENT DOCUMENTS

2014/0320909 A1* 10/2014 Shimazaki ............ H04W 8/005
358/1.15
2015/0331650 A1* 11/2015 Moritomo ............. G06F 3/1292
358/1.15

* cited by examiner

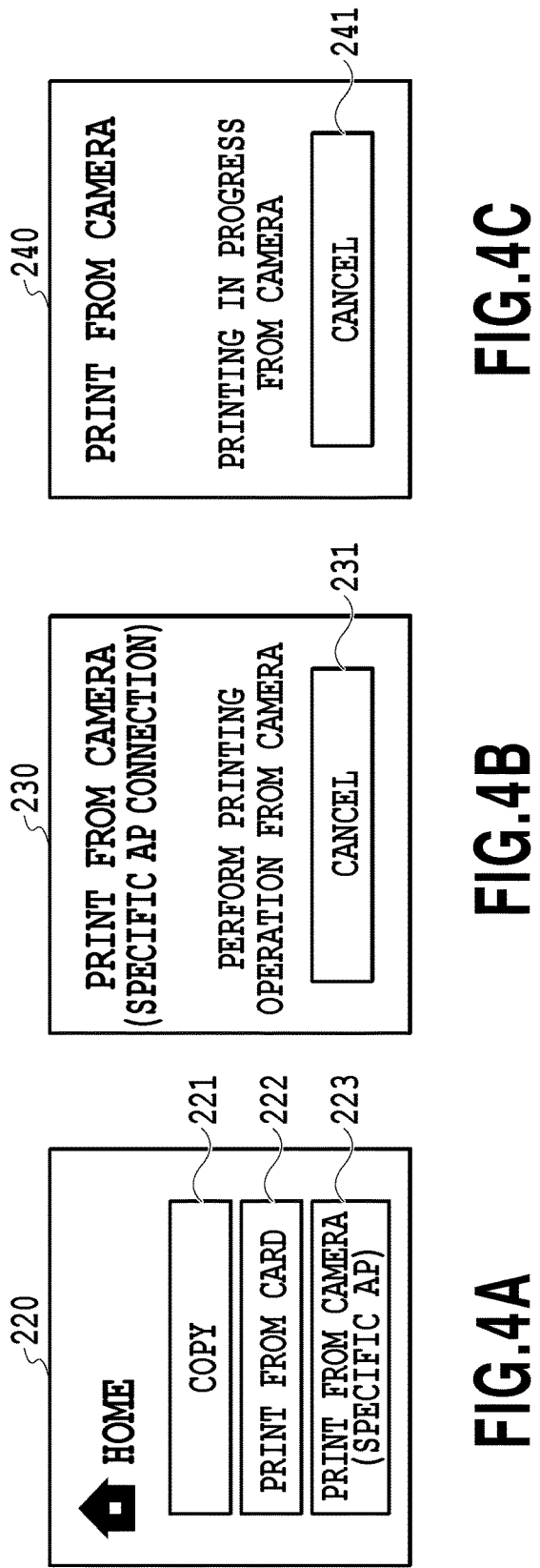

IMAGE PRINTING SYSTEM, METHOD IN IMAGE PROCESSING APPARATUS, AND STORAGE MEDIUM

BACKGROUND OF THE INVENTION

Field of the Invention

The present invention relates to an image printing system, and particularly, to an image printing system that connects an image processing apparatus, such as a digital camera, and a printing apparatus and prints an image, a method in an image processing apparatus, and a storage medium.

Description of the Related Art

In the image printing system, a function called camera direct printing (hereinafter, also referred to simply as direct printing) is made use of, which connects a digital camera and a printing apparatus, transmits an image captured by the digital camera directly to the printing apparatus, and prints the image. Conventionally, the mainstream camera direct printing was that which used a wired connection, in which a digital camera and a printing apparatus are connected by a USB cable or the like. In recent years, as both the digital camera and the printing apparatus, products mounting a wireless LAN function have spread and the camera direct printing has also begun to be performed via a wireless LAN. For example, Japanese Patent Laid-Open No. 2007-76187 has disclosed the technique to perform camera direct printing with a wireless connection by wirelessly connecting a digital camera and a printing apparatus.

However, the camera direct printing via a network premises that a digital camera and a printing apparatus are connected to each other via a network. In many cases, a frame mounted type printing apparatus is connected at all times to a network environment, such as a domestic wireless LAN. In contrast to this, a digital camera is highly portable and operates on a battery, and therefore, is connected to a network environment in accordance with the necessity in many cases. Because of this, in the case where camera direct printing is performed by connecting a digital camera and a printing apparatus via a network, it is necessary to first establish a wireless LAN connection between the digital camera and the printing apparatus. In this case, it is necessary to set authentication information, such as an SSID (Service Set Identifier) and a password for the wireless LAN connection to both the digital camera and the printing apparatus. Because of this, such a problem has occurred that only a user with high information literacy can use camera direct printing.

As a method of facilitating a connection to a printing apparatus, there is an access point mode (hereinafter, referred to as a specific access point mode) in which a printing apparatus is taken to be an access point and fixed authentication information prepared in advance for the connection is used by both a user terminal and the printing apparatus. By using fixed authentication information, it is no longer necessary for a user to set authentication information to both the user terminal and the printing apparatus, and therefore, the connection to the printing apparatus is made easier.

However, both the device operated by a user and the printing apparatus are not necessarily compatible with the specific access point mode. For example, there is a case where the user device or the printing apparatus is not compatible with the specific access point mode. In the case such as this, a user has to perform the operation to switch between performing and not performing printing in the specific access point mode for the user device and the printing apparatus, and therefore, the user operation becomes complicated.

SUMMARY OF THE INVENTION

The image printing system according to the present invention is an image printing system including: an image processing apparatus that stores an image to be printed; and a printing apparatus that is capable of operating as a first access point by fixed authentication information for a wireless LAN connection and which prints the image transmitted from the image processing apparatus via a wireless LAN, and the printing apparatus includes: a control unit configured to control a communication by a wireless LAN in a first mode for performing a wireless LAN connection with the image processing apparatus that stores the fixed authentication information without communicating with the printing apparatus by the printing apparatus operating as the first access point, or in a second mode of performing a wireless LAN connection with the image processing apparatus via a second access point different from the printing apparatus and the image processing apparatus; and a signal transmission unit configured to transmit a beacon signal including a specific SSID included in the fixed authentication information in a case where the communication is controlled in the first mode by the control unit, and the image processing apparatus includes: a detection unit configured to detect a beacon signal in a case of receiving instructions to print the image to be printed from a user; and a transmission unit configured to transmit the image to be printed to the printing apparatus by establishing a connection without intervention of the second access point with the printing apparatus by using the fixed authentication information in a case where the detection unit detects the beacon signal including the specific SSID, and to transmit the image to the printing apparatus by establishing a connection via the second access point with the printing apparatus in a case where the detection unit does not detect the beacon signal including the specific SSID.

Further features of the present invention will become apparent from the following description of exemplary embodiments with reference to the attached drawings.

BRIEF DESCRIPTION OF THE DRAWINGS

FIGS. 4A to 4C are each a diagram showing an example of a screen that is displayed on an operation panel of the printing apparatus;

DESCRIPTION OF THE EMBODIMENTS

In the following, embodiments of the present invention are explained in detail. Components described in the embodiments show aspects as examples of the present invention and are not intended to limit the scope of the present invention to those.

First Embodiment

Figure 1:
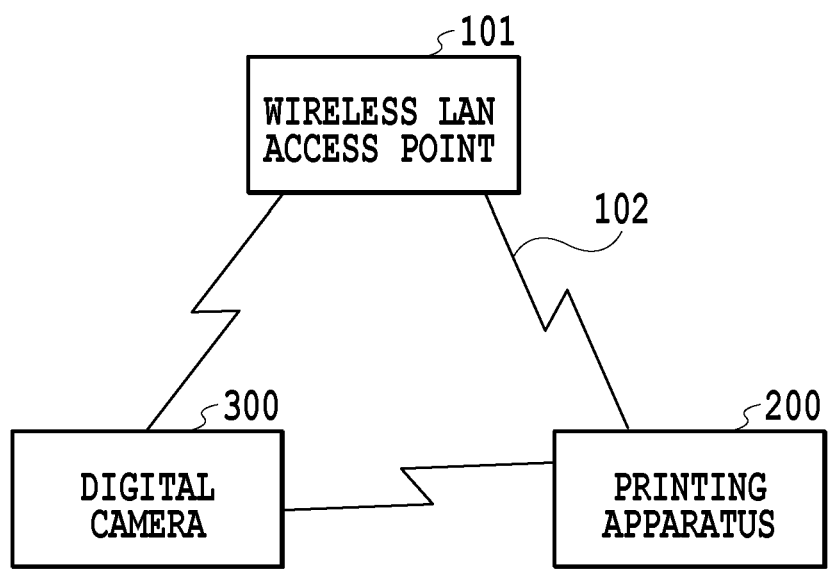
FIG. 1 is a diagram showing a configuration of an image printing system according to a first embodiment of the present invention.

FIG. 1 is a diagram showing a configuration of an image printing system according to a first embodiment of the present invention. The image printing system includes a printing apparatus 200 and an image acquisition device 300. In the present embodiment, the image printing system is taken to be an example in which the image acquisition device as an example of an image processing apparatus that stores an image is a digital camera. The printing apparatus 200, the image acquisition device (digital camera) 300, and an access point 101 are connected to one another by a wireless LAN 102. The printing apparatus 200 and the digital camera 300 can establish a wireless LAN connection via the wireless LAN access point (hereinafter, simply referred to as access point) 101. Further, the printing apparatus 200 and the digital camera 300 themselves can operate as an access point, respectively. Consequently, the digital camera 300 and the printing apparatus 200 can establish a direct wireless LAN connection without intervention of the access point 101. In FIG. 1, the one printing apparatus 200 is shown, but any number of printing apparatuses may be included in the image printing system. Further, in FIG. 1, the one digital camera 300 is shown, but any number of image acquisition devices may be included in the image printing system.

Figure 2:
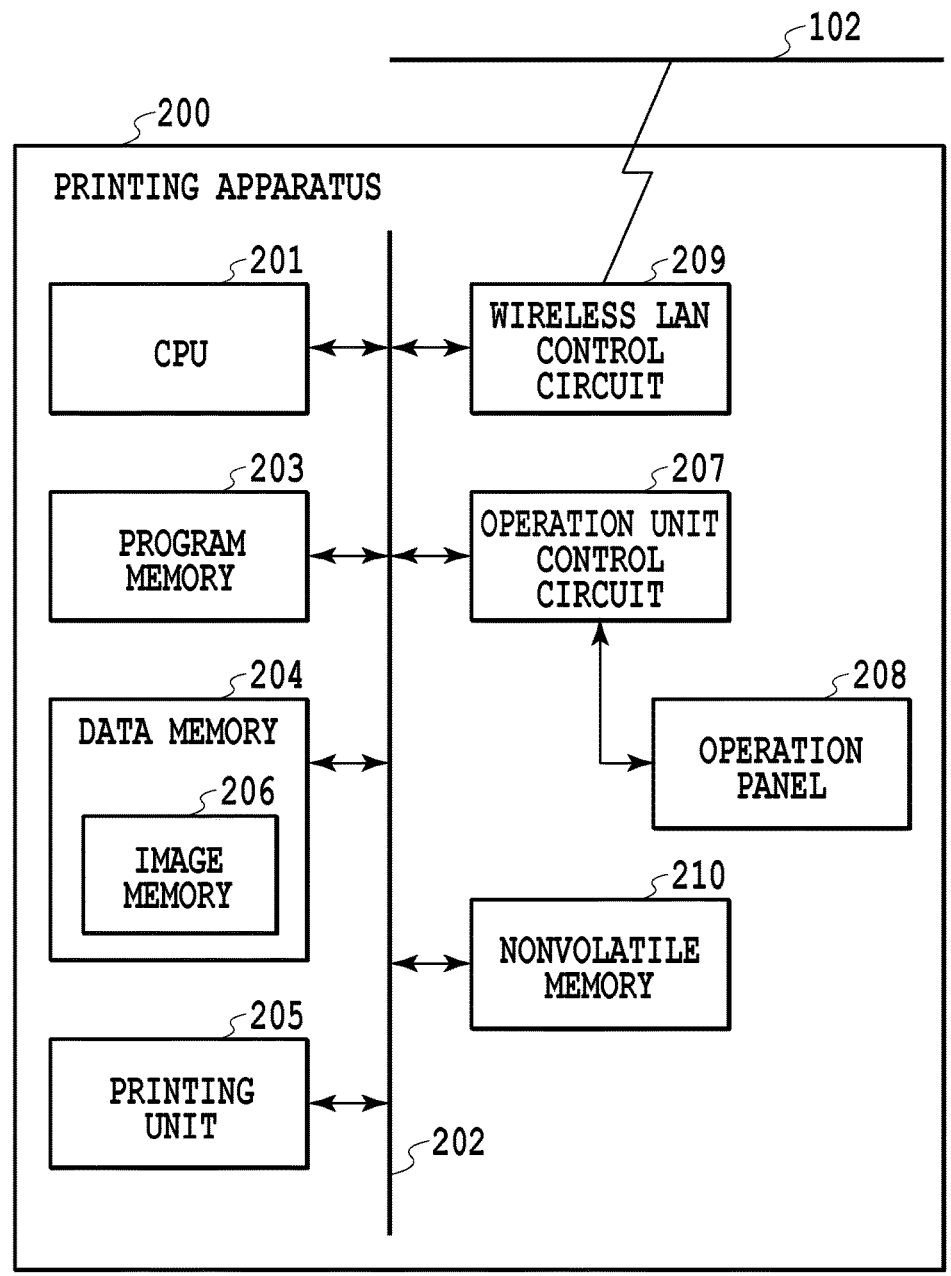
FIG. 2 is a block diagram showing a configuration of a printing apparatus.

FIG. 2 is a block diagram showing a configuration of the printing apparatus 200. The printing apparatus 200 includes a CPU 201, a program memory 203, a data memory 204, a printing unit 205, an operation unit control circuit 207, a wireless LAN control circuit 209, and a nonvolatile memory 210. Each component is connected to one another via an internal bus 202. The data memory 204 includes an image memory 206. The operation unit control circuit 207 is connected with an operation panel 208.

The CPU 201 is a microprocessor. The program memory 203 is a ROM. The data memory 204 is a RAM. The CPU 201 operates in accordance with control programs stored in the program memory 203 and data stored in the data memory 204. The CPU 201 controls the printing unit 205 and prints an image indicated by image data stored in the image memory 206 on a printing medium. Further, the CPU 201 causes the operation panel 208 to display the state of the printing apparatus, display a menu for selecting various functions, and so on, by controlling the operation unit control circuit 207. The operation panel 208 is, for example, a touch panel. A user performs an operation for an object by touching the object displayed on the operation panel 208. Further, the CPU 201 receives a user operation for the operation panel 208 via the operation unit control circuit 207. Furthermore, the CPU 201 communicates with another device connected to the wireless LAN 102 via the wireless LAN control circuit 209. Due to this, it is possible for the printing apparatus 200 to cause the printing unit 205 to perform printing by receiving a print job from another device. Further, it is possible for the CPU 201 to cause the printing apparatus 200 itself to operate as an access point by controlling the wireless LAN control circuit 209. The nonvolatile memory 210 is a battery backup RAM, an EEPROM, a flash memory and the like and capable of storing data stored therein even in the state where no power source is supplied to the printing apparatus 200. To the nonvolatile memory 210, information that needs to be stored even in the case where the power source of the printing apparatus 200 is turned off, such as setting information for the printing apparatus 200, is written.

Figure 3:
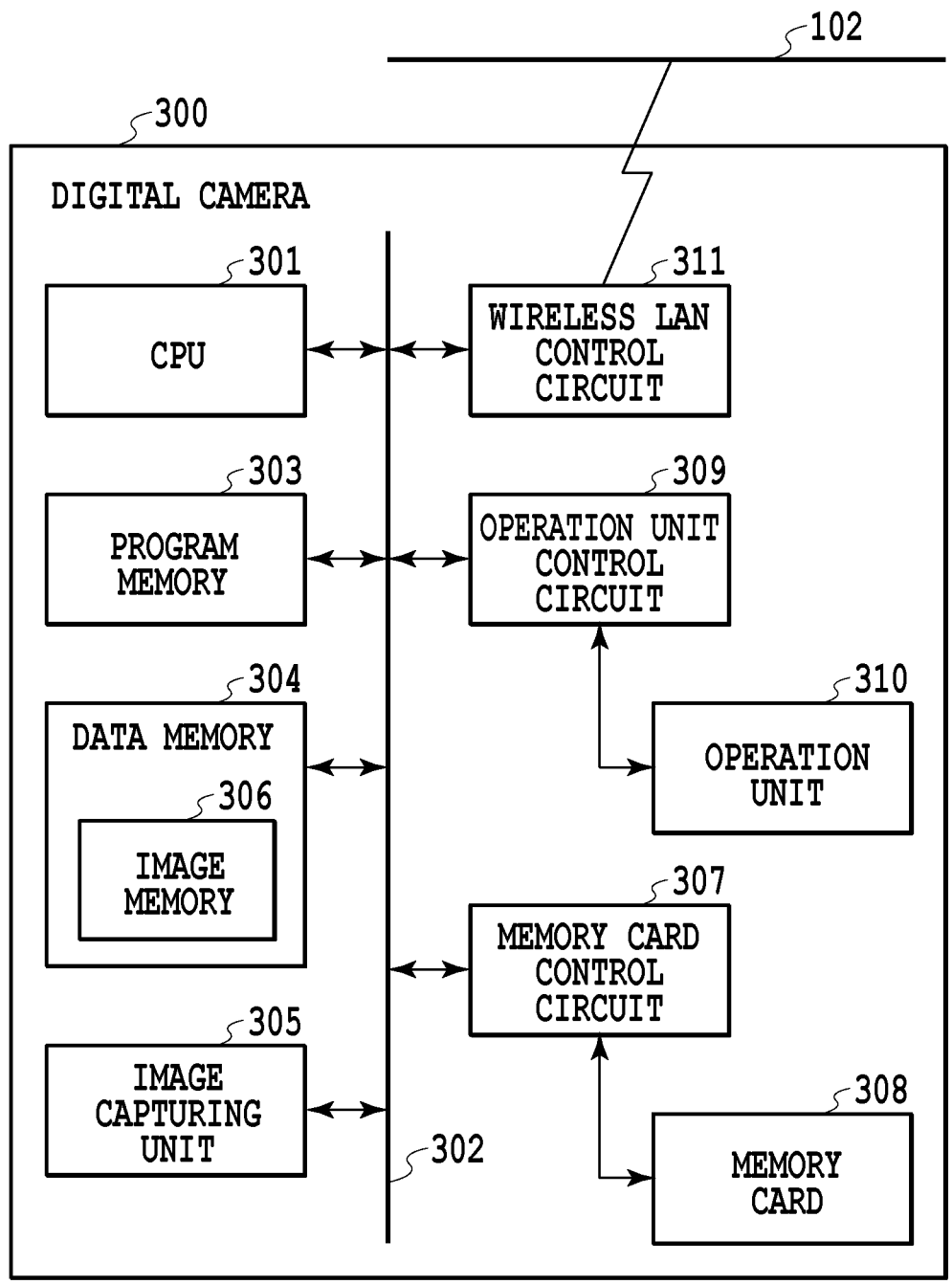
FIG. 3 is a block diagram showing a configuration of a digital camera.

FIG. 3 is a block diagram showing a configuration of the digital camera 300. The digital camera 300 includes a CPU 301, a program memory 303, a data memory 304, an image capturing unit 305, a memory card control circuit 307, an operation unit control circuit 309, and a wireless LAN control circuit 311. Each component is connected to one another via an internal bus 302. The data memory 304 includes an image memory 306. The memory card control circuit 307 controls read and write of data for a memory card 308 inserted into a memory card slot (not shown schematically) or the like included in the digital camera 300. The operation unit control circuit 309 is connected with an operation panel 310.

The CPU 301 is a microprocessor. The program memory 303 is a ROM. The data memory 304 is a RAM. The CPU 301 operates in accordance with control programs stored in the program memory 303 and data stored in the data memory 304. The CPU 301 performs image capturing by controlling the image capturing unit 305 and acquires an image to be printed. The CPU 301 stores image data representing an image obtained by image capturing in the image memory 306. The image data stored in the image memory 306 is converted into an image file format and stored in the memory card 308 via the memory card control circuit 307. Further, the CPU 301 causes the operation panel 310 to reproduce a captured image and display the reproduced image, display a menu to select various functions, and so on, by controlling the operation unit control circuit 309. The operation panel 310 is a touch panel or the like similar to the operation unit 208. The CPU 301 receives a user operation for the operation panel 310 via the operation unit control circuit 309. Further, the CPU 301 performs communication with another device connected to the wireless LAN 102 via the wireless LAN control circuit 311. Due to this, it is possible for the digital camera 300 to save image data acquired by image capturing in a terminal device or a shared folder on a network and to transmit the image data to the printing apparatus 200 connected to the wireless LAN 102 as a print job. Further, it is possible for the CPU 301 to cause the digital camera 300 itself to operate as an access point by controlling the wireless LAN control circuit 311.

FIGS. 4A to 4C are each a diagram showing an example of a screen (hereinafter referred to as an operation screen) that is displayed on the operation panel 208 of the printing apparatus 200. In FIG. 4A, a Home screen 220, which is a standby screen, is shown. On the Home screen 220, a "Copy" button 221, a "Print from card" button 222, and a "Print from camera" button 223 are arranged. The "Copy" button 221 is a button to move into a copy mode. The "Print from card" button 222 is a button to move into a mode of printing image data stored in a memory card inserted into a card slot (not shown schematically) or the like included in the printing apparatus 200. The "Print from camera" button 223 is a button to move into a mode of performing direct printing from the digital camera 300. The printing apparatus 200 is in a normal connection mode while displaying the Home screen 220 and is capable of receiving and performing a print job in the normal connection mode. Here, the normal connection mode refers to an infrastructure mode of connecting with the digital camera 300 via the access point 101. On the other hand, as a mode capable of easily connecting with the digital camera 300 without the need to perform any connection setting, there is a specific access point mode (hereinafter, referred to as a specific AP mode).

In the specific AP mode, it is possible for the printing apparatus 200 to operate as an access point by fixed authentication information (unique SSID, password). The digital camera 300 stores the unique SSID and password necessary for the printing apparatus 200 to operate as an access point in the program memory 303. Then, at the time of moving into the specific AP mode, to be described later, an attempt to connect with an access point is made in accordance with the unique SSID and password stored in the program memory 303 even in the case where neither SSID nor password is input by a user. That is, the above-described unique SSID and password are stored in advance in each of the apparatus and the device without the communication between the digital camera 300 and the printing apparatus 200 and without the input by a user at the operation panel 208 or the operation panel 310. Because of this, in the specific AP mode that uses the unique SSID and password, it is possible to easily connect the digital camera 300 to the printing apparatus 200.

By pressing the "Print from camera" button 223 on the Home screen 220, it is possible for a user to cause the printing apparatus 200 to make a transition into the specific AP mode. Upon making a transition into the specific AP mode, the printing apparatus 200 causes the operation panel 208 to display a camera printing standby screen 230 shown in FIG. 4B. On the camera printing standby screen 230, a Cancel button 231 is displayed along with a message that prompts a user to perform a printing operation from the digital camera 300. By a user performing the printing operation for the digital camera 300, a print job is transmitted to the printing apparatus 200 in the specific AP mode. On the other hand, in the case where the Cancel button 231 is pressed, the printing apparatus 200 returns to the normal connection mode from the specific AP mode and the operation panel 208 returns to the Home screen 220. In FIG. 4C, a camera printing-in-progress screen 240 is shown, which is displayed during printing of a print job received from the digital camera 300 in the specific AP mode. On the camera printing-in-progress screen 240, a Cancel button 241 is displayed along with a message indicating that the print job from the digital camera 300 is being performed. In the case where the Cancel button 241 is pressed, the printing apparatus 200 aborts the print job being performed and terminates the mode of performing direct printing. Then, the operation panel 208 returns to the Home screen 220.

Figure 5C:
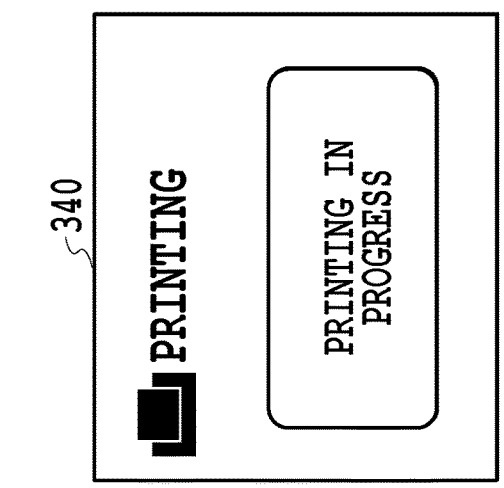
FIGS. 5A to 5C are each a diagram showing an example of an operation screen that is displayed on an operation panel of the digital camera.
Figure 5B:
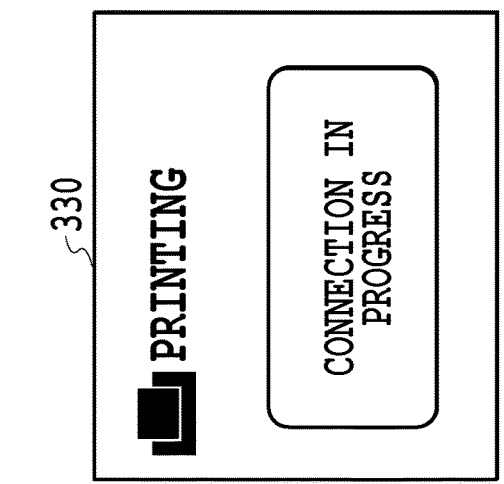
Figure 5A:
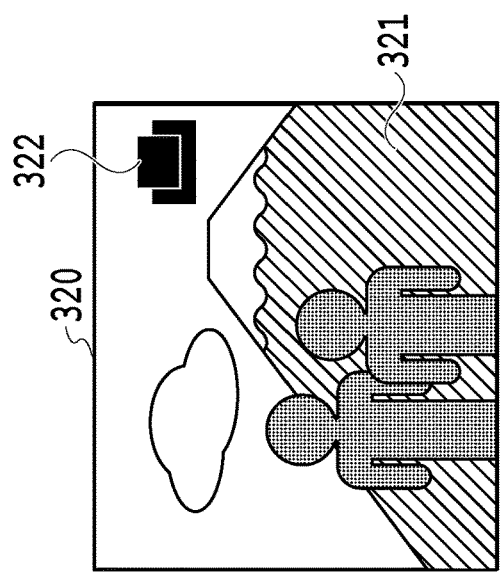

FIGS. 5A to 5C are each a diagram showing an example of an operation screen that is displayed on the operation panel 310 of the digital camera 300. In FIG. 5A, an image reproduction screen 320 is shown. On the image reproduction screen 320, an image 321 obtained by performing image capturing is displayed on the entire screen. Along with the image 321, on the image reproduction screen 320, a printing execution button 322 is displayed. In the case where the printing execution button 322 is pressed, image data corresponding to the displayed image is transmitted to the printing apparatus 200 as a print job. In FIG. 5B, a Connection-in-progress screen 330 is shown. In the case where the printing execution button 322 on the image reproduction screen 320 is pressed, the Connection-in-progress screen 330 is displayed. During the display of the Connection-in-progress screen 330, the digital camera 300 determines a connection method with the printing apparatus 200 and connects with the printing apparatus 200 by a connection method in accordance with the results of the determination. In the case where the digital camera 300 and the printing apparatus 200 are connected, a Printing-in-progress screen 340 shown in FIG. 5C is displayed. Then, in the printing apparatus 200, printing in accordance with the print job (image data) received from the digital camera 300 is performed.

Figure 6:
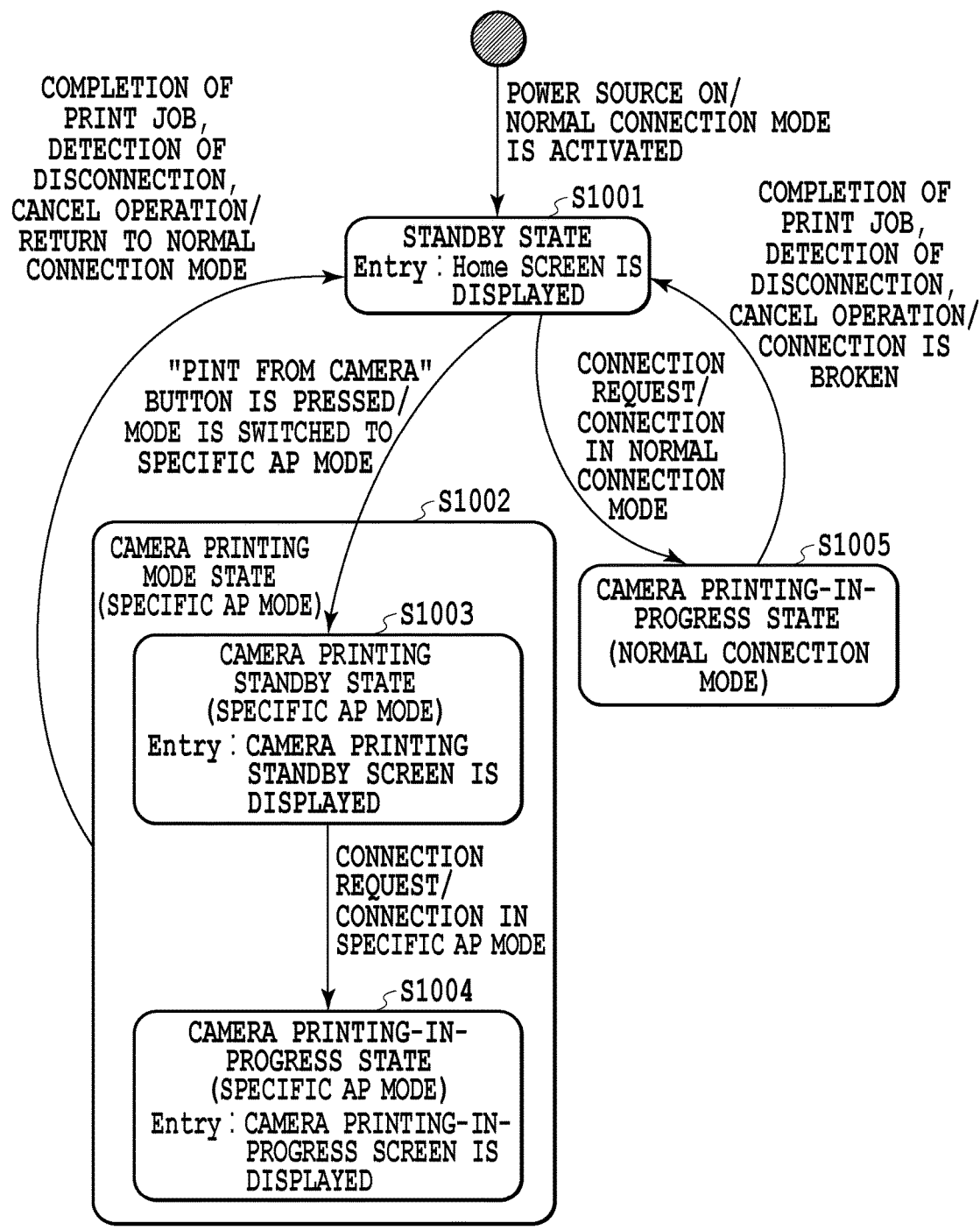
FIG. 6 is a diagram showing a state transition of the printing apparatus.

FIG. 6 is a diagram showing a state transition of the printing apparatus 200. The diagram shown in FIG. 6 is described in accordance with UML. A rectangle whose corner is round indicates a state and an arrow connecting states (rectangles whose corner is round) indicates a state transition. Further, a character string that follows "Entry:" indicates contents of an action that is performed in the case where the printing apparatus 200 enters each state. To the arrow, a character string indicating an event name that triggers a state transition and following "/", a character string indicating an action that is performed at the time of state transition are attached. A black circle indicates the initial state (power source off state). Upon detecting a power source on event in the initial state, the printing apparatus 200 makes a transition into a standby state S1001. At this time, the printing apparatus 200 is activated in a state where the connection method of the wireless LAN is set to the normal connection mode. In general, a frame mounted type printing apparatus, for which the specific AP mode and the normal connection mode can be specified as the connection method with a digital camera, enters a mode of connecting to an access point as an infrastructure mode, i.e., the normal connection mode at the time of power source on. Upon making a transition into the standby state S1001, the printing apparatus 200 displays the Home screen 220 on the operation panel 208. In the standby state S1001, the printing apparatus 200 waits for reception of a print job in the normal connection mode. Upon receipt of a connection request transmitted from the digital camera 300, a connection request event occurs. Then, the printing apparatus 200 connects in the normal connection mode and receives a print job transmitted successively from the digital camera 300. Then, the printing apparatus 200 makes a transition into a camera printing-in-progress state S1005. In the camera printing-in-progress state S1005, the printing apparatus 200 performs the received print job. The procedure and the like from the reception of a print job until execution of the print job is performed in accordance with a publicly known procedure, for example, a procedure specified by the standard, such as DPS over IP, and therefore, detailed explanation is omitted here. Upon detecting the completion of the print job, the disconnection from the digital camera 300, or an event that occurs by an operation to cancel printing, the printing apparatus 200 breaks the connection with the digital camera 300. Then, the printing apparatus 200 makes a transition into the standby state S1001. The state transition of the printing apparatus 200 in the normal connection mode is as described above.

The execution of a print job in the specific AP mode is started by the "Print from camera" button 223 being pressed in the standby state S1001. Upon detecting an event indicating that the "Print from camera" button 223 has been pressed in the standby state S1001, the printing apparatus 200 makes a transition into a camera printing mode state S1002 as well as switching the connection method of the wireless LAN to the specific AP mode. The specific AP mode is a communication mode (connection mode) dedicated for printing between the digital camera 300 and the printing apparatus 200 using fixed authentication information. The fixed authentication information is authentication information common to the digital camera 300 and the printing apparatus 200 and includes a fixed SSID (hereinafter, referred to as a specific SSID) and a fixed authentication password determined in advance. The fixed authentication information is information that cannot be set or changed by a user. In the present embodiment, the fixed authentication information is written in advance to the program memory 303 of the digital camera 300 and the nonvolatile memory 210 of the printing apparatus 200. The camera printing mode state S1002 includes a camera printing standby state S1003 and a camera printing-in-progress state S1004 as sub states. Upon entering the camera printing mode state S1002, the printing apparatus 200 first enters the camera printing standby state S1003. Upon entering the camera printing standby state S1003, the printing apparatus 200 displays the camera printing standby screen 230 on the operation panel 208. In the case where a connection request from the digital camera 300 is received in the camera printing standby state S1003, a connection request event occurs. Then, the printing apparatus 200 connects with the digital camera in the specific AP mode and makes a transition into the camera printing-in-progress state S1004. Upon entering the camera printing-in-progress state S1004, the printing apparatus 200 displays the camera printing-in-progress screen 240 on the operation panel. Upon detecting an event that occurs by the completion of the print job in the camera printing mode state S1002, the printing apparatus 200 makes a transition into the standby state S1001 as well as switching the wireless LAN connection to the normal connection mode. Also in the case where the disconnection from the digital camera 300 or an event that occurs by the Cancel buttons 231, 241 on the operation panel 208 being pressed is detected in the camera printing mode state S1002, the printing apparatus 200 similarly returns to the standby state S1001.

The above is the series of state transition in the printing apparatus 200 in the case where direct printing is performed from the digital camera 300. The printing apparatus 200 may be configured so as to perform various functions by making a transition into a state, not shown schematically, upon receipt of an event other than the events shown in FIG. 6. Further, on the Home screen 220, a button and the like to receive various operations may be provided besides the "Copy" button 221 and the "Print from card" button 222.

Figure 7:
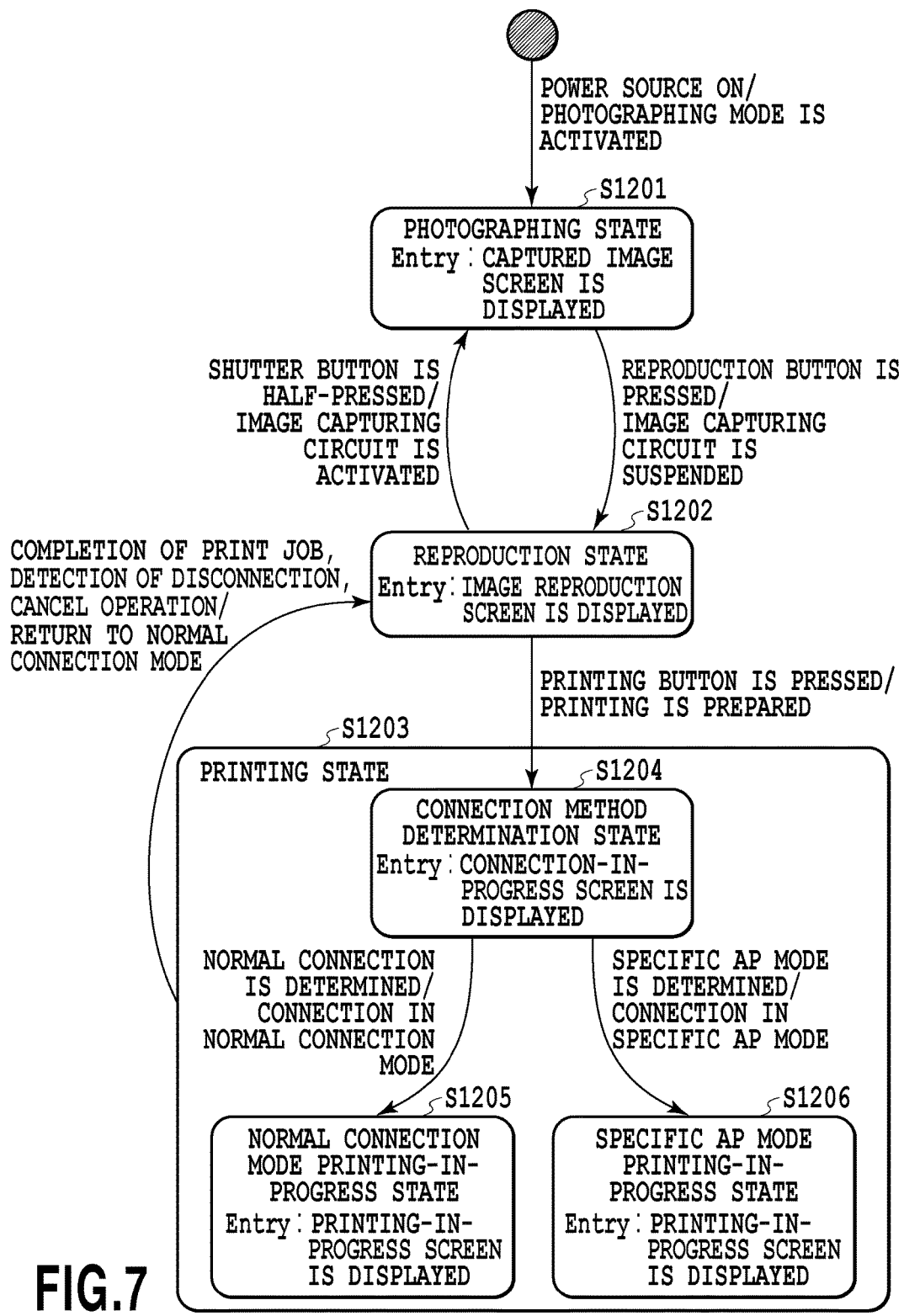
FIG. 7 is a diagram showing a state transition of the digital camera.

FIG. 7 is a diagram showing a state transition of the digital camera 300. Upon detecting a power source on event in the initial state (power source off state), the digital camera 300 makes a transition into a photographing state S1201. In the photographing state S1201, it is possible for the digital camera 300 to capture an image of a still image and a moving image and on the operation panel 310, a captured image screen, not shown schematically, is displayed. Upon detecting an event indicating that a reproduction button (not shown schematically) has been pressed in the photographing state S1201, the digital camera 300 suspends an image capturing circuit, not shown schematically, and makes a transition into a reproduction state S1202. The digital camera 300 displays the image reproduction screen 320 on the operation panel 310 in the reproduction state S1202. Further, upon detecting an even indicating that a shutter button (not shown schematically) has been half-pressed in the reproduction state S1202, the digital camera 300 returns to the photographing state S1201. On the other hand, upon detecting an event indicating that the printing execution button 322 on the image reproduction screen 320 has been pressed, the digital camera 300 specifies the image being displayed on the image reproduction screen 320 as a target of printing. Then, the digital camera 300 makes a transition into a printing state S1203. The printing state S1203 includes a connection method determination state S1204, a normal connection mode printing-in-progress state S1205, and a specific AP mode printing-in-progress state S1206 as sub states. Upon entering the printing state S1203, first, the digital camera 300 enters the connection method determination state S1204. Upon entering the connection method determination state S1204, the digital camera 300 displays the Connection-in-progress screen 330 on the operation panel and determines whether to connect in the normal connection mode or to connect in the specific AP mode. In the case of determining to connect in the normal connection mode, the digital camera 300 connects with the printing apparatus 200 in the normal connection mode and makes a transition into the normal connection mode printing-in-progress state S1205. In the case of determining to connect in the specific AP mode, the digital camera 300 connects with the printing apparatus 200 in the specific AP mode and makes a transition into the specific AP mode printing-in-progress state S1206. Upon entering the normal connection mode printing-in-progress state S1205 or the specific AP mode printing-in-progress state S1206, the digital camera 300 displays the Printing-in-progress screen 340 on the operation panel. In the normal connection mode printing-in-progress state S1205 and the specific AP mode printing-in-progress state S1206, the digital camera 300 transmits image data corresponding to the image specified in the reproduction state S1202 to the printing apparatus 200 as a print job. Upon detecting completion of the print job, the disconnection from the printing apparatus 200, or an event indicating that the cancel operation has occurred in the printing state S1203, the digital camera 300 makes a transition into the reproduction state S1202. At this time, the digital camera 300 returns the connection mode to the normal connection mode.

The above is the series of state transition to transmit a print job to the printing apparatus 200 in the digital camera 300. The digital camera 300 may be configured so as to perform various functions by making a transition into a state, not shown schematically, by detecting an event other than the events shown in FIG. 7. Further, a screen, not shown schematically, may be displayed on the operation panel. Furthermore, a button and the like to receive various operations may be provided on the image reproduction screen 320 and the like.

Figure 8:
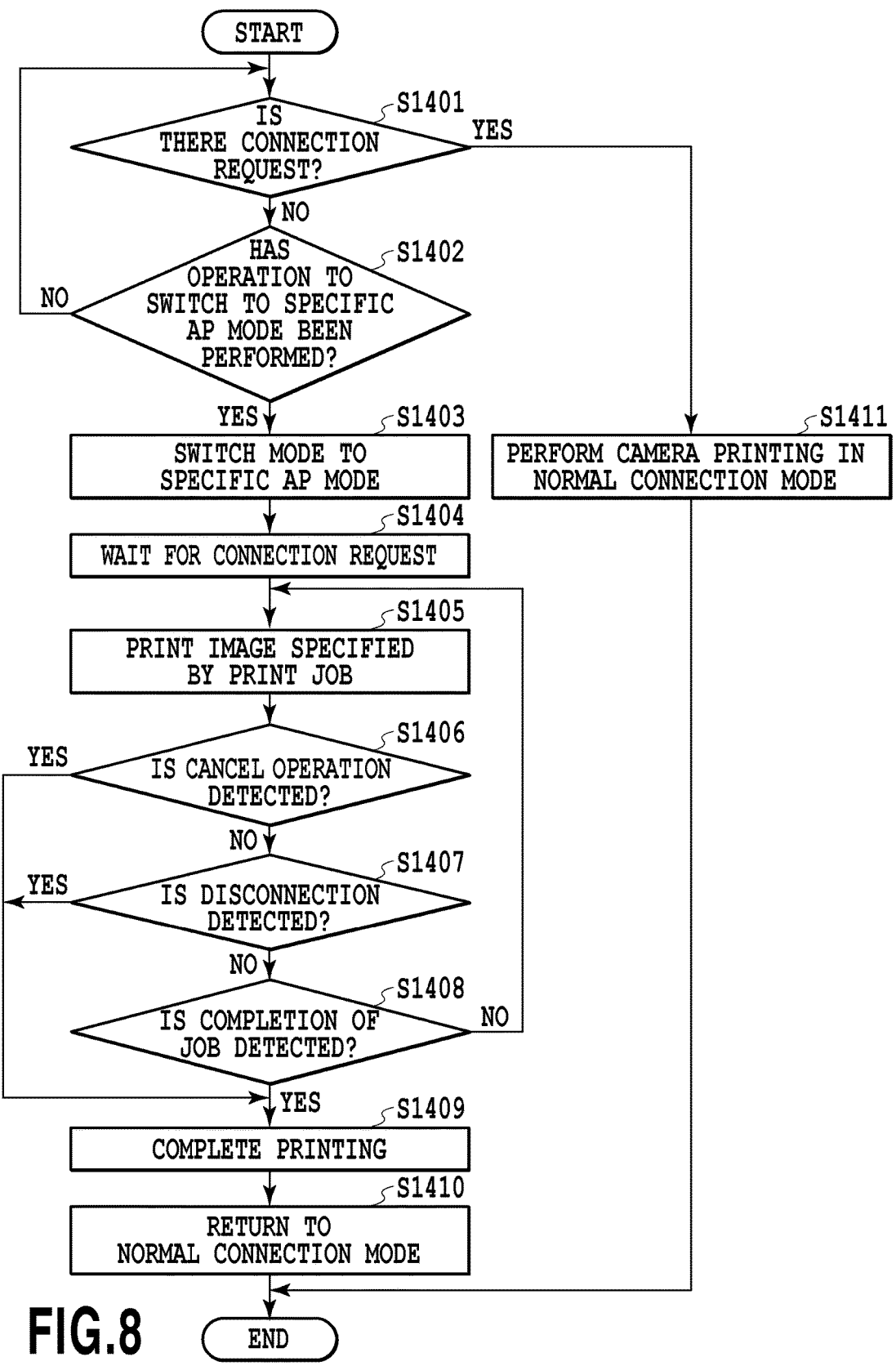
FIG. 8 is a flowchart showing printing processing in the printing apparatus.

FIG. 8 is a flowchart showing printing processing in the printing apparatus 200. In FIG. 8, processing after a transition has been made into the standby state S1001 shown in FIG. 6 is shown. The processing shown in FIG. 8 is performed by the CPU 201 loading a program stored in the program memory 203 and executing the program.

At step S1401, the CPU 201 checks whether there is a connection request from the digital camera 300 via the wireless LAN 102 and the wireless LAN control circuit 209. In the standby state S1001, the printing apparatus 200 is in the normal connection mode. Consequently, in the case of receiving a connection request (YES at step S1401), the CPU 201 performs connection and printing processing in the normal connection mode (step S1411) and terminates the processing. In the case where there is no connection request (NO at step S1401), the printing apparatus 200 checks whether the switching operation into the specific AP mode has been performed by a user. Specifically, the printing apparatus 200 checks whether the "Print from camera" button 223 on the Home screen 220 has been pressed. In the case where the "Print from camera" button 223 has been pressed (YES at step S1402), the printing apparatus 200 advances to step S1403. In the case where the "Print from camera" button 223 has not been pressed by a user (NO at step S1402), the printing apparatus 200 returns to step S1401 and performs the processing at steps S1401 and S1402 repeatedly. At step S1403, the printing apparatus 200 switches the mode to the specific AP mode in which the printing apparatus 200 itself is an access point by controlling the wireless LAN control circuit 209. At this time, the CPU 201 causes the printing apparatus 200 to operate as an access point having the fixed authentication information described above as the setting of an access point. Then, CPU 201 waits for a connection request from the digital camera 300 while periodically issuing a beacon signal including the specific SSID included in the above-described fixed authentication information (step S1404). Upon receipt of a connection request from the digital camera 300, the printing apparatus 200 receives a print job and performs printing of an image specified by the print job (step S1405). The CPU 201 performs the processing at steps S1405 to S1408 repeatedly while performing the received print job. In the case where a connection request from the digital camera 300 is not received within a predetermined period of time at step S1404, the processing may advance to step S1410. At steps S1406, S1407, and S1408, the CPU 201 monitors the cancel operation, the disconnection from the digital camera 300, and the completion of the print job, respectively, and in the case of detecting any of them, the printing processing is terminated (step S1409). In the case where the printing processing is terminated, the printing apparatus 200 returns to the normal connection mode by controlling the wireless LAN control circuit 209 (step S1410) and terminates the processing.

Figure 9:
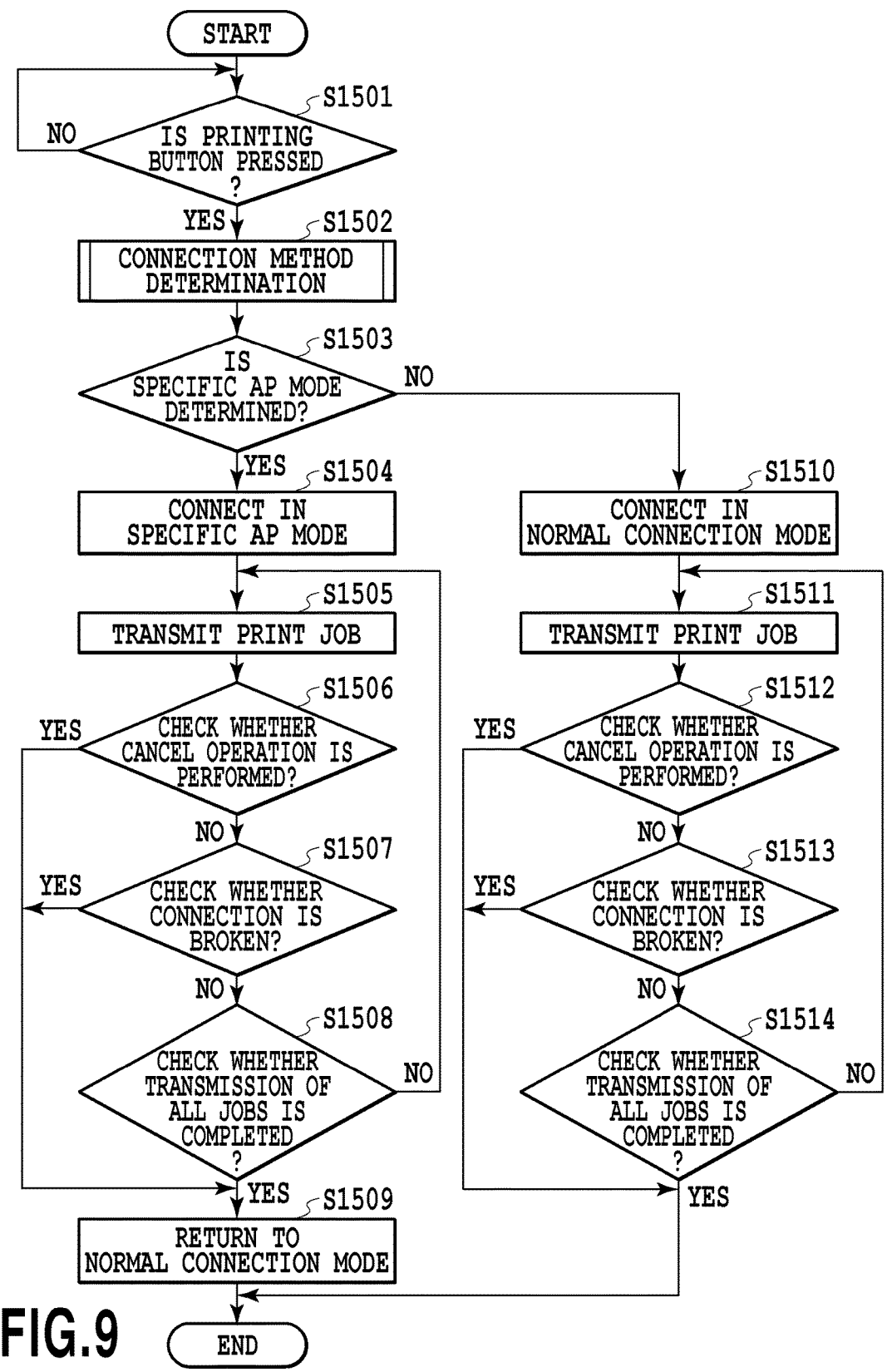
FIG. 9 is a flowchart showing transmission processing of a print job in the digital camera.

FIG. 9 is a flowchart showing print job transmission processing in the digital camera 300. In FIG. 9, processing after a transition has been made into the reproduction state S1202 shown in FIG. 7 is shown. The processing shown in FIG. 9 is performed by the CPU 301 loading a program stored in the program memory 303 and executing the program.

The CPU 301 monitors whether the printing execution button 322 on the image reproduction screen 320 has been pressed, i.e., instructions to transmit a print job have been given by a user (step S1501). In the case where the printing execution button 322 has been pressed (YES at step S1501), the processing advances to step S1502. At step S1501, the CPU 301 continues to monitor the printing execution button 322 until the printing execution button 322 is pressed. Next, the CPU 301 determines a connection method with the printing apparatus 200 (step S1502). Details of the connection method determination processing at step S1502 will be described later. In the case of determining the connection method to be the specific AP mode (YES at step S1503), the CPU 301 advances to step S1504 and in the case of determining the connection method to be the normal connection mode (NO at step S1503), the CPU 301 advances to step S1510. At step S1504, the CPU 301 connects with the printing apparatus 200 set to the specific AP mode as a wireless LAN client by controlling the wireless LAN control circuit 311. Specifically, the digital camera 300 searches for an access point by the fixed authentication information stored in advance and connects to the searched-for access point. After the connection is completed, the CPU 301 transmits the print job for printing the image being displayed on the image reproduction screen 320 to the printing apparatus 200 (step S1505). While transmitting the print job, the CPU 301 periodically performs the processing at steps S1506 to S1508 repeatedly. At step S1506, the CPU 301 checks whether the cancel operation by a user has been performed and in the case where the cancel operation has been performed, the CPU 301 aborts the transmission of the print job and advances to step S1509. At step S1507, the CPU 301 checks whether the connection with the printing apparatus 200 has been broken. In the case where the connection has been broken, the CPU 301 aborts the transmission of the print job and advances to step S1509. At step S1508, the CPU 301 checks whether the transmission of all the print jobs has been completed. In the case where the transmission of all the print jobs has not been completed (NO at step S1508), the CPU 301 returns to step S1505. In the case where the transmission of all the print jobs has been completed (YES at step S1508), the CPU 301 advances to step S1509. Finally, the CPU 301 returns the wireless LAN to the original connection mode, i.e., the normal connection mode by controlling the wireless LAN control circuit 311 (step S1509). Then, the CPU 301 terminates the processing.

On the other hand, at step S1510, the CPU 301 connects with the printing apparatus 200 in the normal connection mode by controlling the wireless LAN control circuit 311. The processing at steps S1511 to S1514 is the same as the processing at steps S1505 to S1508 in the specific AP mode, and therefore, explanation is omitted. In the normal connection mode, it is not necessary for the CPU 301 to perform the processing (processing corresponding to step S1509) to return to the normal connection mode after the transmission of all the print jobs is completed. Because of this, after step S1514, the CPU 301 terminates the processing without performing the processing corresponding to step S1509.

Figure 10:
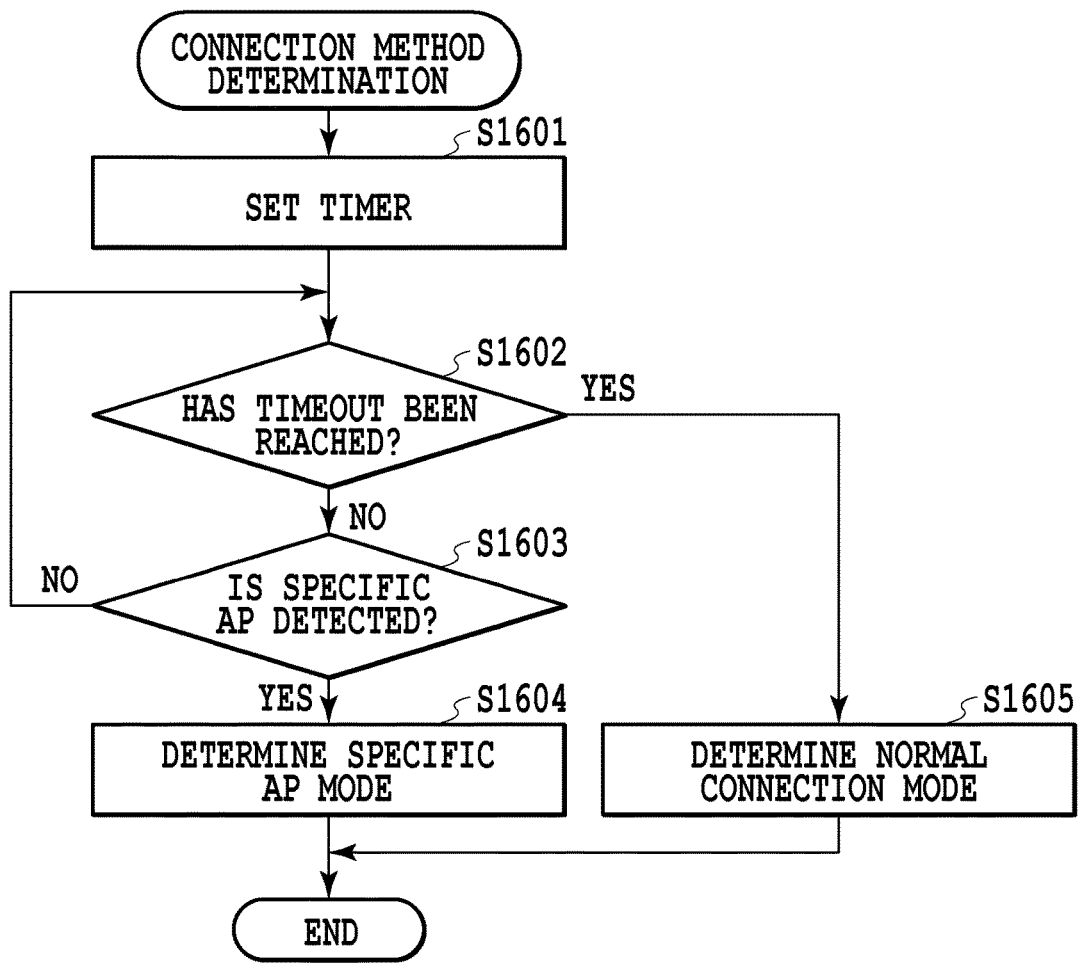
FIG. 10 is a flowchart showing connection method determination processing at step S1502.

FIG. 10 is a flowchart showing the connection method determination processing at step S1502. The digital camera 300 sets a timer for measuring the timeout time of the connection method determination processing (step S1601). The digital camera 300 detects a device set to the specific AP mode (hereinafter, sometimes simply referred to as a specific AP) (step S1603) while monitoring the timeout of the timer (step S1602). In the case where the specific AP is located in the range in which the radio wave reaches, the beacon signal including the specific SSID is observed periodically. Consequently, at step S1603, the digital camera 300 detects the specific AP by monitoring the beacon signal including the specific SSID. In the case of detecting the beacon signal including the specific SSID (YES at step S1603), the digital camera 300 determines that the specific AP is located near.

In the present embodiment, in the case where the printing apparatus 200 is operating in the specific AP mode, the printing apparatus 200 is detected as the specific AP. Consequently, the digital camera 300 determines the connection method with the printing apparatus 200 to be the specific AP mode (step S1604) and terminates the processing. In the case where the timeout of the timer has been reached with no beacon signal including the specific SSID being detected (YES at step S1602), the digital camera 300 determines the connection method with the printing apparatus 200 to be the normal connection mode (step S1605) and terminates the processing.

By the processing such as this, in the case where a printing apparatus set to the specific AP mode is located near the digital camera 300, the printing apparatus is detected by the digital camera 300. Then, it is possible for the digital camera 300 to directly transmit a print job to the detected printing apparatus set to the specific AP mode in the specific AP mode without intervention of an access point. Further, in the case of an environment in which both a printing apparatus in the normal connection mode and a printing apparatus in the specific AP mode exist, the connection method of the digital camera 300 and that of the printing apparatus are determined to be the specific AP mode. As a result of this, in the case where a user explicitly specifies the specific AP mode by pressing the "Print from camera" button 223 of the printing apparatus, printing is performed in the specific AP mode without exception.

Figure 11:
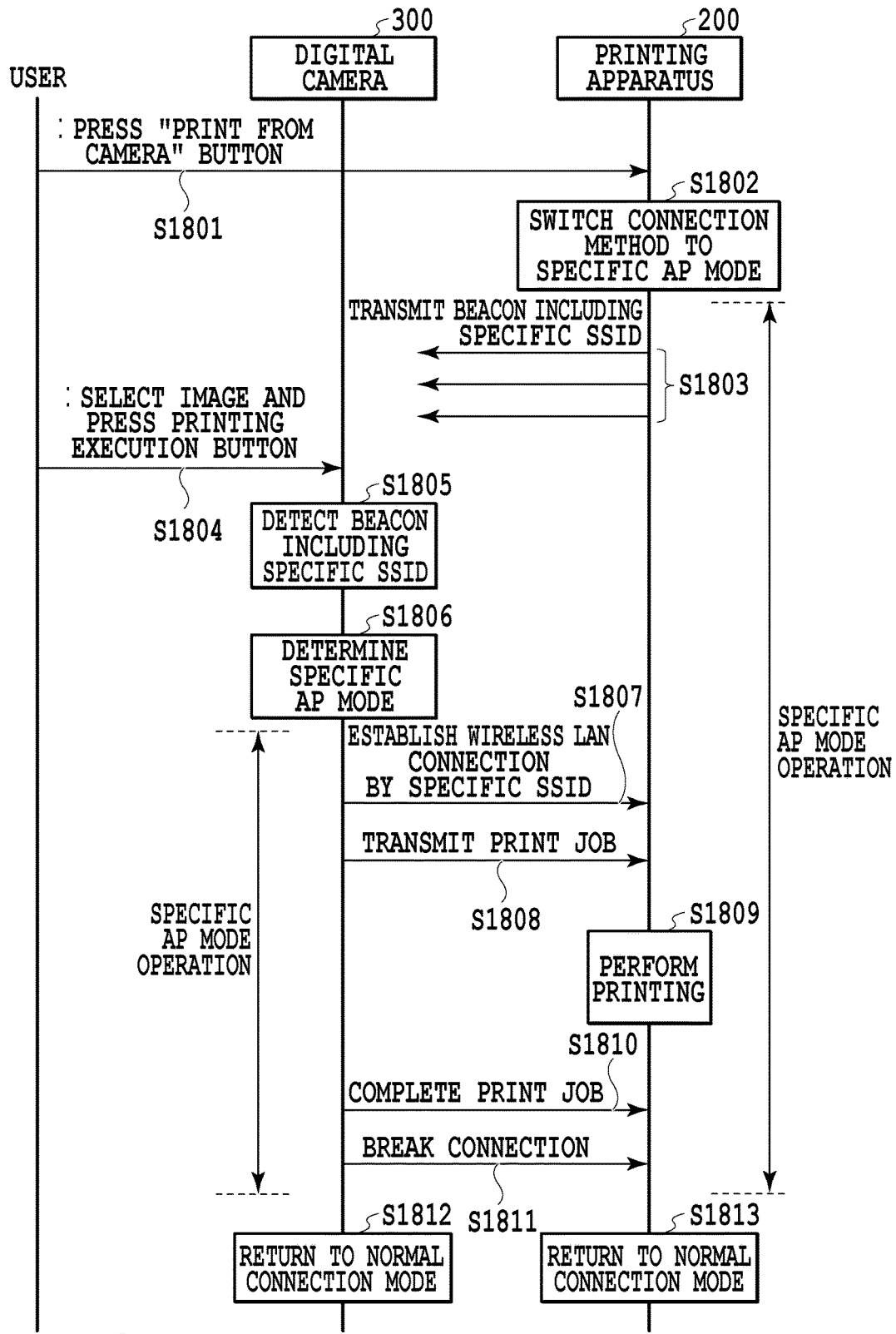
FIG. 11 is a sequence diagram showing the operation of the image printing system in which the printing apparatus and the digital camera are connected in a specific access point mode.

FIG. 11 is a sequence diagram showing the operation of the image printing system in which the printing apparatus 200 and the digital camera 300 are connected in the specific AP mode. In the case where a user presses the "Print from camera" button 223 on the Home screen 220 of the printing apparatus 200 (step S1801), the printing apparatus 200 switches the connection method with the digital camera 300 to the specific AP mode (step S1802). The printing apparatus 200 set to the specific AP mode periodically transmits the beacon signal including the specific SSID by controlling the wireless LAN control circuit 209 (step S1803). In the case where a user presses, following this, the printing execution button 322 on the image reproduction screen 320 of the digital camera 300 (step S1804), the digital camera 300 begins to monitor the beacon signal including the specific SSID. Upon detecting the beacon signal including the specific SSID (step S1805), the digital camera 300 determines the connection method to be the specific AP mode (step S1806). Then, the digital camera 300 makes a request for a connection in the specific AP mode to the printing apparatus 200. That is, the digital camera 300 establishes a wireless LAN connection with the printing apparatus 200 by using the fixed authentication information including the specific SSID (step S1807) and the digital camera 300 transmits a print job to the printing apparatus 200 (step S1808). The printing apparatus 200 performs printing of the received print job (step S1809). Upon the completion of the print job (step S1810), the digital camera 300 breaks the connection with the printing apparatus 200 (step S1811). Then, the digital camera 300 and the printing apparatus 200 return to the normal connection mode, respectively (steps S1812, S1813).

In the above-described sequence, it is necessary for a user to perform the operation to specify the specific AP mode for the printing apparatus 200. However, for the digital camera 300, it is possible to transmit a print job in the specific AP mode only by performing the operation to select an image to be printed and to give instructions to perform printing.

Figure 12:
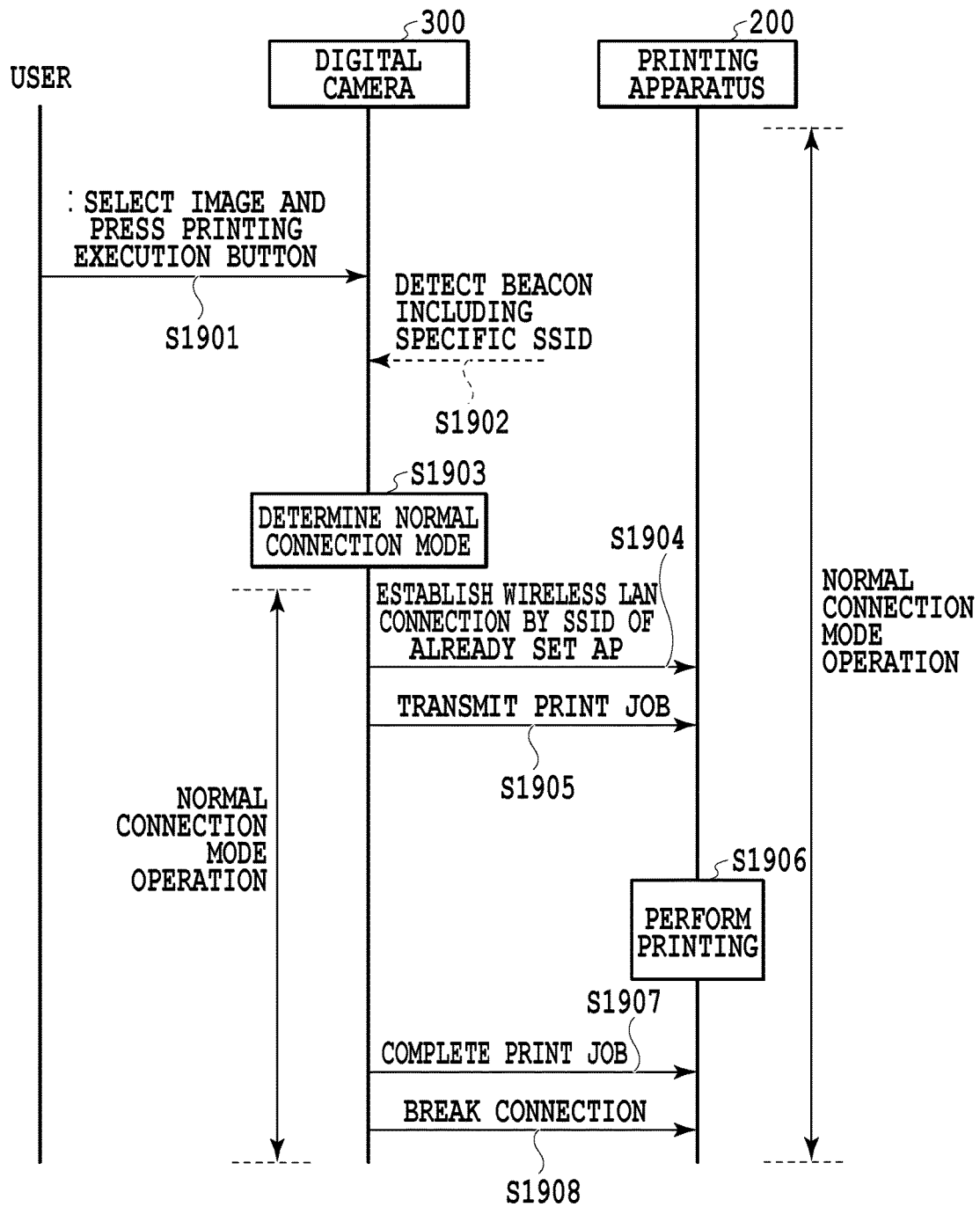
FIG. 12 is a sequence diagram showing the operation of the image printing system in which the printing apparatus and the digital camera are connected in a normal connection mode.

FIG. 12 is a sequence diagram showing the operation of the image printing system in which the printing apparatus 200 and the digital camera 300 are connected in the normal connection mode. In the case where the printing execution button 322 on the image reproduction screen 320 of the digital camera 300 is pressed (step S1901), the digital camera 300 begins to detect the beacon signal including the specific SSID (step S1902). At this time, the printing apparatus 200 is in the normal connection mode, and therefore, the beacon signal including the specific SSID is not detected. Consequently, the digital camera 300 determines the connection method to be the normal connection mode (step S1903). Then, the digital camera 300 establishes a connection with the printing apparatus 200 via an access point that is already set by using the SSID of the access point (step S1904) and transmits a print job to the printing apparatus 200 (step S1905). The printing apparatus 200 performs printing of the received print job (step S1906). Upon the completion of the print job (step S1907), the digital camera 300 breaks the connection with the printing apparatus 200 (step S1908).

By the configuration such as above, it is possible for a user to give instructions to perform printing by the same operation as that for the digital camera for both the printing apparatus in the specific AP mode and the printing apparatus in the normal connection mode. Consequently, according to the present embodiment, it is no longer necessary for a user to perform the operation to select the connection method for the digital camera and a user is not caused to perform a complicated operation. Further, in the present embodiment, the printing apparatus to be used for printing is selected from two of the printing apparatus in the normal connection mode and the printing apparatus in the specific AP mode, but a combination of the selection-target printing apparatuses may be different from the above-described combination. Further, in an environment in which a plurality of printing apparatuses is installed, it is difficult to specify a printing apparatus to be used for printing. However, according to the present embodiment, it is only necessary for a user to operate a printing apparatus that the user desires to use for printing (e.g., by pressing the "Print from camera" button 223) to set the printing apparatus to the specific AP mode. By doing so, it is possible for a user to perform printing by a desired printing apparatus without the operation to select a printing apparatus to be used for printing for the camera.

In the present embodiment, the image printing system in which the image acquisition device is a digital camera is taken to be an example, but the image acquisition device may be a device other than the digital camera. Consequently, the image acquisition device may include another component to acquire an image to be printed in place of or in addition to the image capturing unit 305.

Second Embodiment

Figure 13:
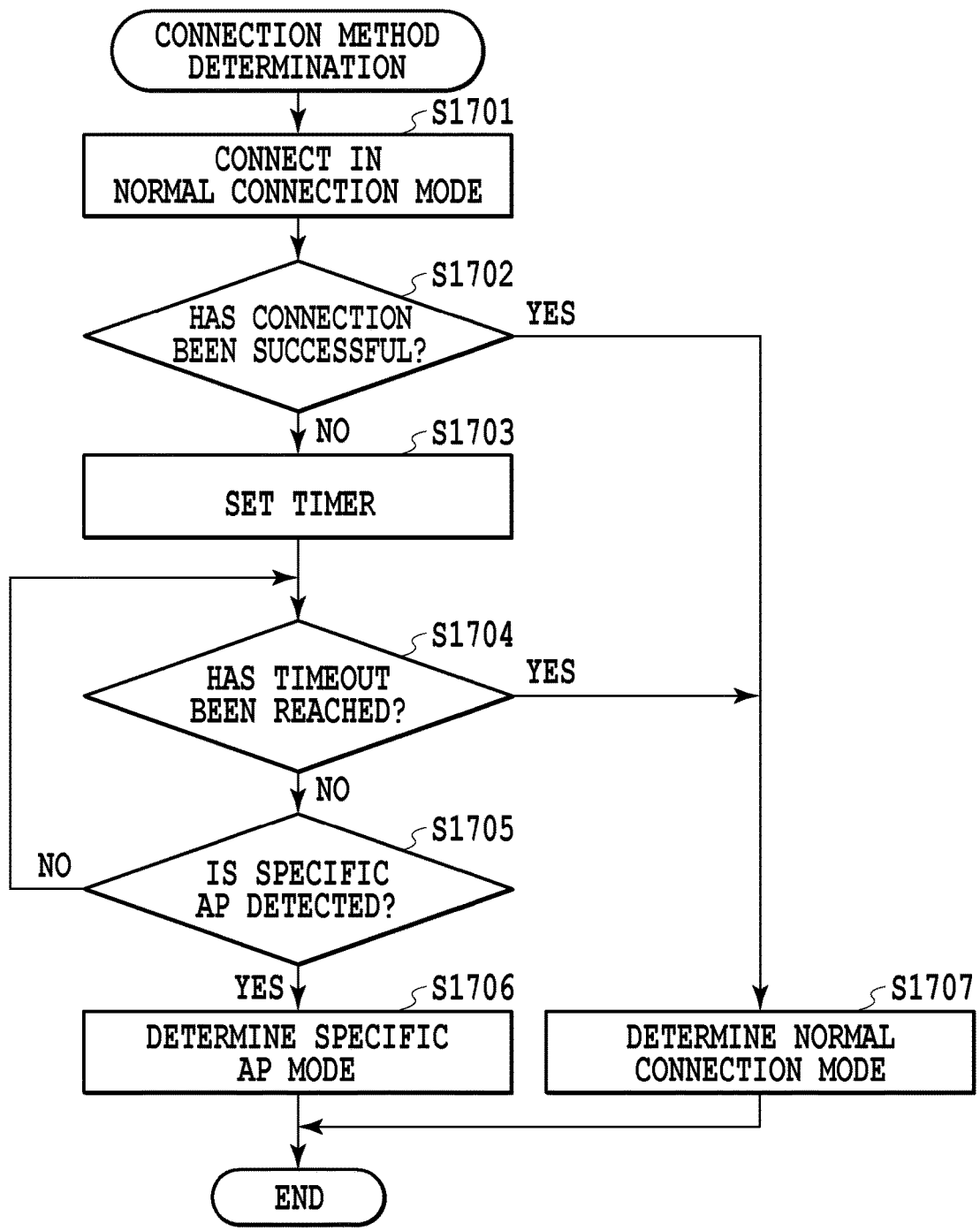
FIG. 13 is a flowchart showing connection method determination processing at step S1502 in a second embodiment.
Figure 14:
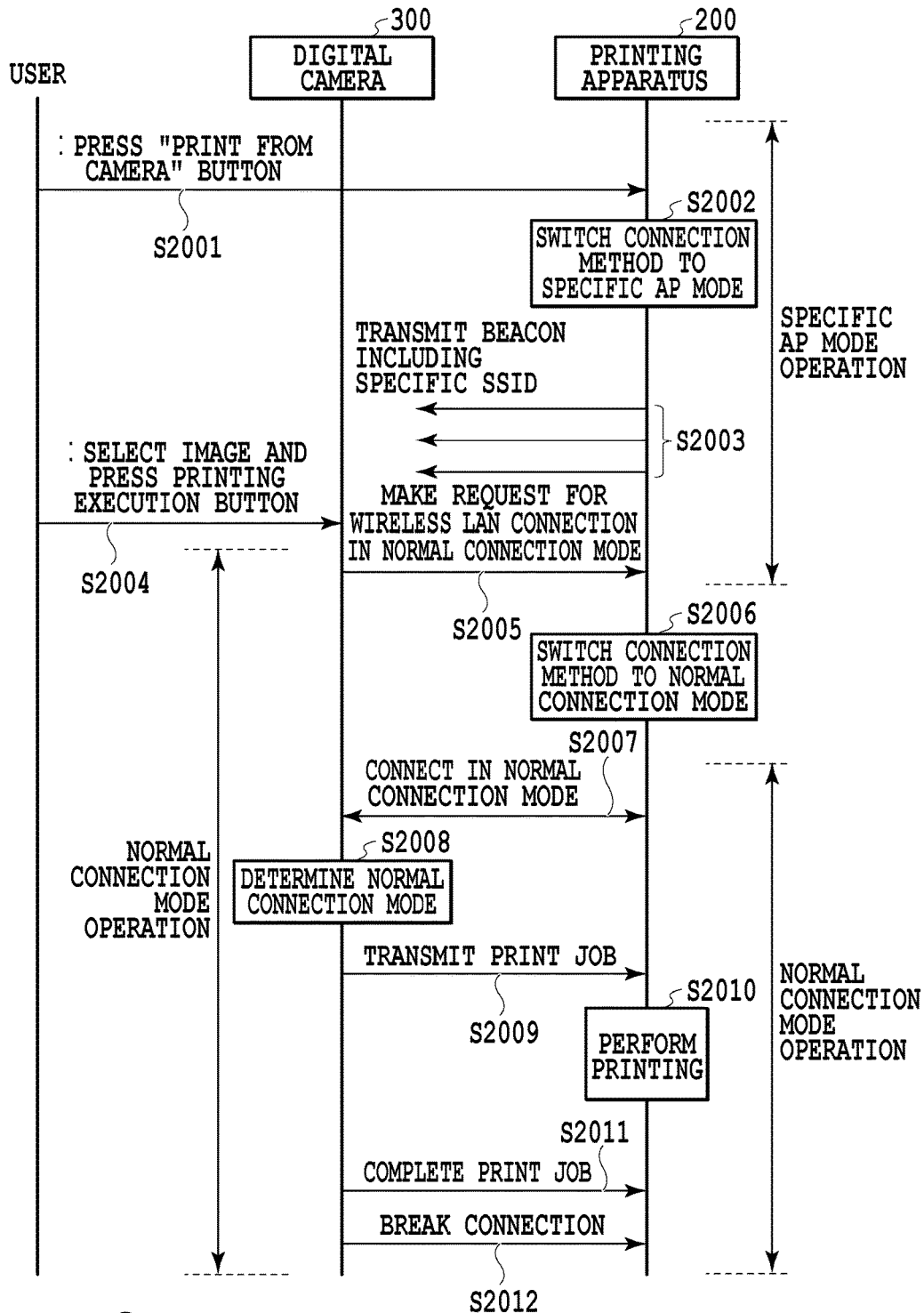
FIG. 14 is a sequence diagram showing the operation of the second embodiment of an image printing system in which the printing apparatus and the digital camera are connected in the normal connection mode.

FIG. 13 is a flowchart showing connection method determination processing at step S1502 in a second embodiment. FIG. 14 is a sequence diagram showing the operation of the second embodiment of the image printing system in which the printing apparatus 200 and the digital camera 300 are connected in the normal connection mode. In the following, the portions different from those of the first embodiment are explained and explanation of the same portions as those of the first embodiment is omitted.

The digital camera 300 makes a request for a connection with the printing apparatus 200 while remaining in the normal connection mode (step S1701) and determines whether a connection is established (step S1702). Here, in the case where the digital camera 300 has already been set so that a connection with the printing apparatus 200 in the normal connection mode is possible, at step S1701, a connection is established in the normal connection mode. In this case, it is not necessary to connect in the specific AP mode. Consequently, in the case where a connection is established in the normal connection mode (YES at step S1702), the digital camera 300 determines the connection method to be the normal connection mode (step S1707) and terminates the processing. In the case where a connection in the normal connection mode is not established (NO at step S1702), the digital camera 300 sets a timer to measure the timeout time of the determination processing (step S1703). The digital camera 300 detects the specific AP (step S1705) while monitoring the timeout of the timer (step S1704). Specifically, the digital camera 300 monitors the beacon signal including the specific SSID as at step S1603. In the case of detecting the beacon including the specific SSID, the digital camera 300 determines that the specific AP is located near and determines the connection method with the printing apparatus 200 to be the specific AP mode (step S1706) and terminates the processing. In the case where the timeout of the timer has been reached with no beacon including the specific SSID being detected (YES at step S1704), the digital camera 300 determines the connection method with the printing apparatus 200 to be the normal connection mode (step S1707) and terminates the processing.

FIG. 14 is a sequence diagram showing the operation of the second embodiment of the image printing system in which the printing apparatus 200 and the digital camera 300 are connected in the normal connection mode. In the case where a user presses the "Print from camera" button 223 on the Home screen 220 of the printing apparatus 200 (step S2001), the printing apparatus 200 switches the connection method with the digital camera 300 to the specific AP mode (step S2002). The printing apparatus 200 set to the specific AP mode periodically transmits the beacon signal including the specific SSID by controlling the wireless LAN control circuit 209 (step S2003). In the case where a user presses, following this, the printing execution button 322 on the image reproduction screen 320 of the digital camera 300 (step S2004), the digital camera 300 makes a request for a connection in the normal connection mode to the printing apparatus 200 (step S2005). Upon receipt of the connection request, the printing apparatus 200 switches the connection method with the digital camera 300 from the specific AP mode to the normal connection mode (step S2006). Then, a connection in the normal connection mode is established between the digital camera 300 and the printing apparatus 200 (step S2007). The connection in the normal connection mode is established, and therefore, the digital camera 300 determines the connection method to be the normal connection mode (step S2008). This processing corresponds to the processing at S1707 shown in FIG. 13. After this, in the digital camera 300, the processing at step S1510 shown in FIG. 9 is performed. However, the digital camera 300 is already connected with the printing apparatus 200 at step S2007, and therefore, at step S1510 of the second embodiment, the digital camera 300 skips the processing. Following this, the digital camera 300 transmits a print job (step S2009). The printing apparatus 200 performs printing of the received print job (step S2010). Upon the completion of the print job (step S2011), the digital camera 300 breaks the connection with the printing apparatus 200 (step S2012).

By the configuration such as above, as in the first embodiment, it is made possible for a user to give instructions to perform printing by the same operation as that for the digital camera for both the printing apparatus in the specific AP mode and the printing apparatus in the normal connection mode. Because of this, according to the present embodiment, as in the first embodiment, a user is not caused to perform a complicated operation. Further, in the present embodiment, in the case where the digital camera 300 has already been set so that a connection with the printing apparatus 200 is possible in the normal connection mode, priority is given to the connection in the normal connection mode. Due to this, even in the case where a user erroneously performs the operation to switch to the specific AP mode for the printing apparatus capable of printing in the normal connection mode, the digital camera 300 connects with the printing apparatus in the normal connection mode and transmits a print job. Because of this, it is made possible to avoid unnecessary switching to the specific AP mode.

With both the first embodiment and the second embodiment, it is possible to obtain the effect that instructions to perform printing can be given by the same operation as that for the digital camera also for both the printing apparatus in the specific AP mode and the printing apparatus in the normal connection mode. However, the first embodiment and the second embodiment differ in that priority is given to the normal connection mode or to the specific AP mode. However, which of the normal connection mode and the specific AP mode priority is given to changes depending on the environment in which printing is performed. Consequently, it may also be possible to design a configuration in which it is possible for a user to set the image printing system to perform the operation of the first embodiment or the operation of the second embodiment.

Further, in the first embodiment and the second embodiment, the digital camera 300 determines the connection method by determining whether the received beacon signal is the beacon signal including the specific SSID. However, in the case where the specific SSID is a so-called stealth SSID, there is a possibility the true SSID is not transmitted in the beacon signal from the printing apparatus 200. In order to deal with the case such as this, the digital camera 300 transmits a ProbeRequest signal including the specific SSID in the case where, for example, the length of the SSID is 0. Then, the digital camera 300 may be set to the specific AP mode only in the case where a normal ProbeResponse signal is received. This is also true with the case where the SSID included in the beacon signal includes only 0 or the case where the beacon signal including the true SSID is not received.

Further, in the above embodiments, as the device that performs printing, a digital camera is explained as an example, but the device is not limited to this and may be various devices, such as a PC and a smartphone. Furthermore, in place of the printing apparatus in the above embodiments, various devices, such as a PC and a smartphone, may be applied.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is made possible to print an image stored in an image processing apparatus by a printing apparatus without requiring a complicated operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-100670, filed May 19, 2016, which is hereby incorporated by reference wherein in its entirety.

What is claimed is:

1. An image printing system comprising:
an image processing apparatus that stores an image to be printed; and
a printing apparatus that is capable of operating as a first access point by fixed authentication information for a wireless LAN connection and which prints the image transmitted from the image processing apparatus via a wireless LAN, wherein
the printing apparatus includes:
a first communication portion configured to execute a communication by a wireless LAN; and
a first processor;
wherein the first processor controls a communication by the communication portion in a first mode for performing a wireless LAN connection with the image processing apparatus by the printing apparatus operating as the first access point, or in a second mode for performing a wireless LAN connection with the image processing apparatus via a second access point different from the printing apparatus and the image processing apparatus, and
the first communication portion transmits a specific signal in a case where the communication is controlled in the first mode by the first processor, and
the image processing apparatus includes:
a second communication portion configured to execute a communication by a wireless LAN; and
a second processor,
wherein the second processor establishes, by the second communication portion, a connection without intervention of the second access point with the printing apparatus by using the fixed authentication information and transmits the image to the printing apparatus using the established connection, in a case where a predetermined instruction is received and the second processor detects the specific signal, and
the second processor transmits, by the second communication portion, the image to the printing apparatus using a connection via the second access point with the printing apparatus, in a case where the predetermined instruction is received and the second processor does not detect the specific signal, and
the printing apparatus prints the transmitted image.

2. The image printing system according to claim 1, wherein
the second processor makes a connection request for a connection in the second mode to the printing apparatus in a case of receiving the predetermined instruction,
the first communication unit does not transmit the specific signal in a case where a connection via the second access point is established with the image processing apparatus by the connection request, and
the second processor transmits the image to the printing apparatus via the second access point.

3. The image printing system according to claim 2, wherein
the second processor controls the communication in the second mode in a case of receiving the connection request for a connection in the second mode from the image processing apparatus.

4. The image printing system according to claim 1, wherein
the fixed authentication information includes at least a specific SSID and a password.

5. The image printing system according to claim 4, wherein
the specific signal includes the specific SSID, and
the second processor transmits the image to the printing apparatus by using the fixed authentication information, in a case where the second processor detects the specific signal including the specific SSID.

6. The image printing system according to claim 5, wherein
in a case where the signal detected by the second processor does not include the specific SSID,
the second processor determines that the printing apparatus is operating in the first mode, on a condition that the second communication portion transmits a ProbeRequest signal including the specific SSID to the printing apparatus and a ProbeResponse signal corresponding to the ProbeRequest signal is obtained from the printing apparatus, and
the second processor establishes a connection with the printing apparatus without intervention of the second access point by using the fixed authentication information.

7. The image printing system according to claim 1, wherein the first processor changes a communication mode from the second mode to the first mode, in a case where a first predetermined instruction is performed by the user on the printing apparatus, and
the second processor transmits the image by using the fixed authentication information, in a case where a second predetermined instruction as the predetermined instruction is performed by the user on the image processing apparatus and the second processor detects the specific signal.

8. The image printing system according to claim 1, wherein, the second processor begins processing for detecting the specific signal, in a case where the predetermined instruction is performed by the user on the image processing apparatus.

9. The image printing system according to claim 1, wherein the connection without intervention of the second access point is disconnected and the first processor controls the communication in the second mode, based on that the transmission of the image to the printing apparatus operating in the first mode, is completed.

10. A method in an image processing apparatus that transmits an image to be printed to a printing apparatus connected via a wireless LAN, wherein the image processing apparatus includes: a communication portion configured to execute a communication by a wireless LAN; and a processor; the method is executed by the processor comprising the steps of:
   establishing, by the communication portion, a connection without intervention of an access point different from the printing apparatus by using the fixed authentication information and transmitting the image to the printing apparatus using the established connection, in a case where a predetermined instruction is received and a specific signal transmitted from the printing apparatus is detected; and
   transmitting, by the communication portion, the image to the printing apparatus using a connection via the access point with the printing apparatus, in a case where the predetermined instruction is received and the specific signal is not detected.

11. The method according to claim 10, further comprising the step of:
   making a connection request for a connection via the access point to the printing apparatus in a case where the predetermined instruction is received, wherein
   in a case where a connection with the printing apparatus via the access point is established by the connection request, the specific signal is not transmitted from the printing apparatus, and
   the image is transmitted to the printing apparatus via the access point.

12. The method according to claim 10, wherein
   the fixed authentication information includes at least a specific SSID and a password.

13. The method according to claim 12, wherein
   the specific signal includes the specific SSID, and
   the image is transmitted to the printing apparatus by using the fixed authentication information, in a case where the specific signal including the specific SSID is detected.

14. The method according to claim 13, wherein
   in a case where the detected signal does not include the specific SSID, a connection with the printing apparatus is established without intervention of the access point by using the fixed authentication information on a condition that a ProbeRequest signal including the specific SSID is transmitted to the printing apparatus and a ProbeResponse signal corresponding to the ProbeRequest signal is obtained from the printing apparatus.

15. The method according to claim 10, wherein the image is transmitted by using the fixed authentication information, in a case where the predetermined instruction is performed by the user on the image processing apparatus and the specific signal is detected.

16. The method according to claim 10, wherein, the image processing apparatus begins processing for detecting the specific signal, in a case where the predetermined instruction is performed by the user on the image processing apparatus.

17. The method according to claim 10, wherein the connection without intervention of the access point is disconnected, based on that the transmission of the image to the printing apparatus, is completed.

18. An image processing apparatus that stores an image to be printed, comprising:
   a communication portion configured to execute a communication by a wireless LAN with a printing apparatus; and
   a processor,
   wherein the printing apparatus is capable of operating as a first access point by fixed authentication information for a wireless LAN connection and which prints the image transmitted from the image processing apparatus via a wireless LAN, and
   the printing apparatus controls a communication in a first mode for performing a wireless LAN connection with the image processing apparatus by the printing apparatus operating as the first access point, or in a second mode for performing a wireless LAN connection with the image processing apparatus via a second access point different from the printing apparatus and the image processing apparatus, and
   the printing apparatus transmits a specific signal in a case where the communication is controlled in the first mode, and
   the processor establishes, by the communication portion, a connection without intervention of the second access point with the printing apparatus by using the fixed authentication information and transmits the image to the printing apparatus using the established connection, in a case where a predetermined instruction is received and the processor detects the specific signal, and
   the processor transmits, by the communication portion, the image to the printing apparatus using a connection via the second access point with the printing apparatus, in a case where the predetermined instruction is received and the processor does not detect the specific signal, and
   the printing apparatus prints the transmitted image.

19. The image printing system according to claim 18, wherein the processor establishes a connection via the second access point with the printing apparatus and transmits the image to the printing apparatus using the established connection, in a case where the predetermined instruction is received and the processor does not detect the specific signal.

20. The image printing system according to claim 18, wherein the processor establishes a connection without intervention of the second access point with the printing apparatus and transmits the image to the printing apparatus using the established connection, in a case where a predetermined instruction is received and the processor detects the specific signal, even if no instruction is received after the predetermined instruction, and
   the processor transmits the image to the printing apparatus using a connection via the second access point with the printing apparatus, in a case where the predetermined instruction is received and the processor does not detect the specific signal, even if no instruction is received after the predetermined instruction.

* * * * *